UNITED STATES PATENT OFFICE.

BENJAMIN H. LIGHTFOOT, OF PHILADELPHIA, PENNSYLVANIA.

IMPROVEMENT IN COLORING TANNED LEATHER.

Specification forming part of Letters Patent No. 41,011, dated December 22, 1863; reissue No. 5,053, dated September 10, 1872.

Specification describing an Improvement in and Composition for Coloring Tanned Leather, invented by BENJAMIN H. LIGHTFOOT, of Philadelphia, county of Philadelphia, State of Pennsylvania.

My invention consists in the application of petroleum or other oily hydrocarbon, in combination with lamp-black or other suitable coloring matter, to the coloring of tanned leather; which is effected by this composition more rapidly and thoroughly and more cheaply than by that usually employed.

The last process in the currying of leather is termed blacking or coloring; and has, prior to my invention, been accomplished by rubbing on the flesh side of the leather, with a hard brush, a coloring composition consisting of fish-oil and lamp-black; after which is applied, with a brush or sponge, a coat of stiff size or tallow; and when this is dry the surface of the leather is rubbed with a smooth block of glass or its equivalent. It is important that the color should penetrate the leather thoroughly and rapidly.

After repeated experiments I found that the best coloring vehicle was ordinary petroleum; or, in place of the latter, any other oily hydrocarbon, mixed with lamp-black or other suitable coloring matter. About thirteen ounces of lamp-black and a gallon of petroleum, well mixed together, form a suitable composition, which may be applied to the leather in the usual way.

This composition penetrates the leather with very great rapidity, and the coloring of the leather is accomplished thereby not only in less time and at less expense, but more efficiently than by the usual composition.

*Claims.*

1. The application of petroleum or any other oily hydrocarbon, in combination with lamp-black or other coloring matter, to the coloring of tanned leather.

2. As a new article of manufacture, tanned leather, colored by the application of petroleum or any other oily hydrocarbon, in combination with lamp-black or any other suitable coloring matter.

3. A coloring composition for leather, in which petroleum or other oily hydrocarbon is combined with lamp-black or other suitable coloring matter.

In testimony whereof I have signed my name to this specification in the presence of two subscribing witnesses.

BENJAMIN H. LIGHTFOOT.

Witnesses:

WM. A. STEEL,

HARRY SMITH.